United States Patent [19]
Chickering et al.

[11] Patent Number: 4,862,079
[45] Date of Patent: Aug. 29, 1989

[54] MAGNETIC METHOD AND APPARATUS FOR MEASURING AND LOCATING WEAR OF CONTROL RODS IN NUCLEAR REACTORS

[75] Inventors: Ronald W. Chickering, Greensburg; Richard S. Miller, Murrysville; H. Donald Moss, Pittsburgh, all of Pa.

[73] Assignee: Westinghouse Electric Corp., Pittsburgh, Pa.

[21] Appl. No.: 121,812

[22] Filed: Nov. 16, 1987

[51] Int. Cl.[4] .................. G01N 27/82; G01R 33/00; G21C 17/00

[52] U.S. Cl. .................................. 324/227; 324/226; 324/229; 324/232; 324/262; 376/245

[58] Field of Search ............... 324/207, 208, 219–221, 324/226, 227, 229–232, 260–262; 376/245, 258, 259

[56] References Cited

U.S. PATENT DOCUMENTS

| | | |
|---|---|---|
| 2,340,609 | 2/1944 | Mestas ........................ 324/208 X |
| 3,023,312 | 2/1962 | Wood ........................... 324/229 X |
| 3,066,254 | 11/1962 | Price et al. . |
| 3,299,349 | 1/1967 | Tompkins et al. . |
| 3,395,339 | 7/1968 | Brown, Jr. . |
| 3,611,121 | 10/1971 | Vild . |
| 3,693,075 | 9/1972 | Forster . |
| 3,725,778 | 4/1973 | Leonard et al. ..................... 324/227 |
| 3,739,262 | 6/1973 | Seekins . |
| 3,949,292 | 4/1976 | Beaver et al. . |
| 3,968,681 | 7/1976 | Cornforth et al. . |
| 4,053,827 | 10/1977 | Millette et al. ..................... 324/230 |
| 4,083,002 | 4/1978 | Allport ............................... 324/227 |
| 4,101,832 | 7/1978 | Baker et al. ......................... 324/227 |
| 4,445,088 | 4/1984 | Schubel ............................... 324/238 |
| 4,593,244 | 6/1986 | Summers et al. .................... 324/230 |
| 4,641,525 | 2/1987 | Merki ............................. 324/230 X |
| 4,671,170 | 9/1986 | Stanley et al. ..................... 324/229 |
| 4,706,022 | 11/1987 | Kudo ............................. 324/227 X |
| 4,715,442 | 12/1987 | Kahil et al. ...................... 324/229 X |

Primary Examiner—Gerard R. Strecker

[57] ABSTRACT

Apparatus is disclosed for locating and measuring wear in nuclear reactor control rods. Circumferential and radial eddy current test probes produce outputs correspondingly to volume and thickness of the control rod. A method is disclosed to determine cladding wear when the volume and thickness varies beyond preselected limits.

20 Claims, 5 Drawing Sheets

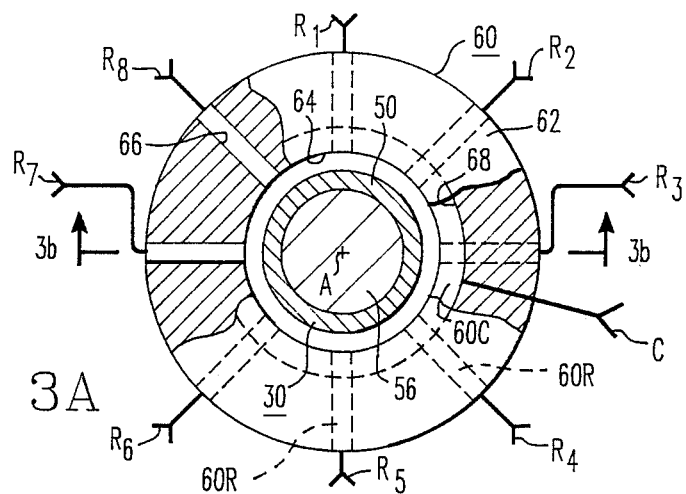
FIG. 3A
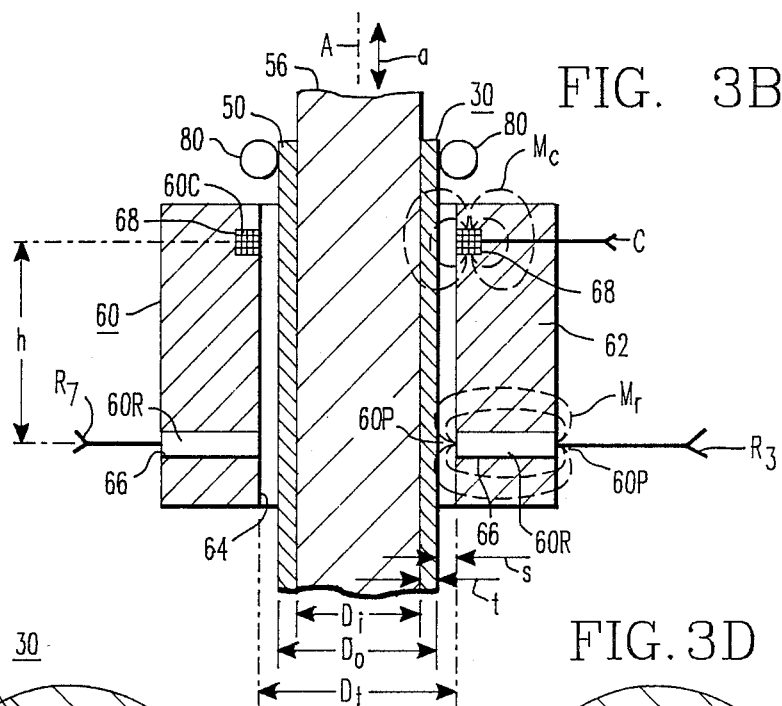
FIG. 3B
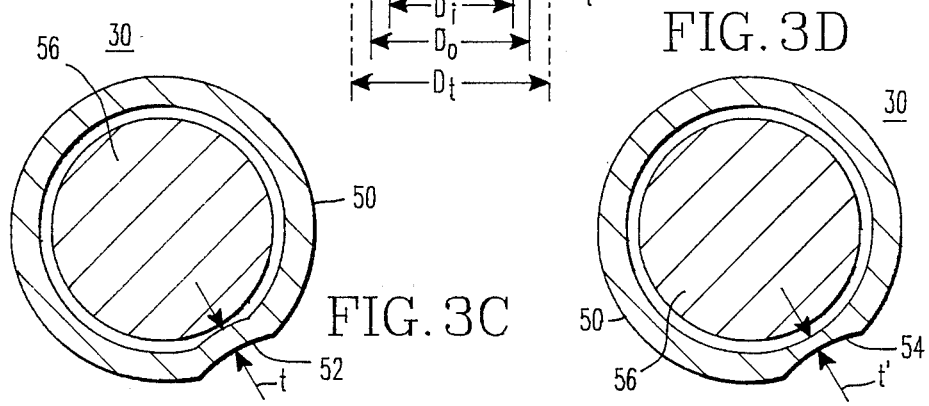
FIG. 3C
FIG. 3D

MAGNETIC METHOD AND APPARATUS FOR MEASURING AND LOCATING WEAR OF CONTROL RODS IN NUCLEAR REACTORS

BACKGROUND OF THE INVENTION

1. Field of the Invention

The present invention relates to methods and apparatus for measuring wear of control rods in nuclear reactors. More particularly, the invention is concerned with an eddy current measuring device which measures volume and thickness variations in the rod at various axial locations. Information thus generated is processed to produce a profile of the rod wear in order to determine available rod useful life and to remove from service rods exceeding the useful life limit.

2. Description of the Prior Art

In a typical nuclear reactor, the reactor core is composed of a plurality of elongated fuel assemblies, each of which contains a plurality of elongated fuel elements or rods. Liquid coolant is pumped upwardly through the core in order to extract heat generated in the core for the production of useful work. The heat output of the core may be regulated by the movement of control rods each comprising an outer tubular sheath containing neutron-absorbing materials therein.

Control rods may wear and fail for a variety of reasons. For example, during power operation of the reactor, most of the regulating control rods are maintained substantially withdrawn from the reactor core, except for a lowermost end of which is located within the upper ends of the guide thimbles. Withdrawn control rods are maintained in spatial relationship with each other by superadjacent guide structures which are known. When in such withdrawn positions, the control rods may experience significant vibration induced by coolant water flow within the guide thimbles and the guide structures. The vibration results in lateral contact of the rod against the internal wall surfaces of the guide thimbles, and the upper guide structures, etc. Consequently, the rod surfaces wear. Also, reciprocal movement of the control rods into and out of the fuel bundle results in axial wear. It is further possible that the control rod cladding surface may crack from other unspecified causes. Continuous wear of the rod cladding can lead to perforation of the rod and exposure of the neutron absorbing contents to the coolant/moderator fluid, which is undesirable.

In the past, attempts to measure, study and analyze rod defects have been conducted for the most part visually in the course of periodic refueling operations. Such attempts have been subject to high uncertainty because visual methods produce qualitative and somewhat ambiguous results. Non-visual methods of detecting defects in pipes have been known for some time. Such methods utilize magnetic leakage and eddy current techniques. However, these methods only sense gross defects such as cracks and deformities, but do not accurately and unambiguously determine the extent or degree of wear in a manner which is convenient to implement. Thus, especially in the case of older reactors, there has arisen a need to more accurately and unambiguously measure control rod wear.

SUMMARY OF THE INVENTION

The present invention provides a method and apparatus for measuring wear in nuclear reactor control rod cladding yielding accurate and unambiguous results. The apparatus includes circumferential probe means for producing an output corresponding to the volume of the test piece to be examined in a zone proximate thereto; radial probe means for producing an output corresponding to the thickness of the test piece within said zone, and means responsive to the volume and thickness outputs generating an output corresponding to unacceptable wear when the values of said outputs are outside preselected limits. In the method, volume and thickness of the test piece are determined and compared with known values.

In one embodiment, the invention comprises at least one eddy current transducer means in the form of a housing for supporting a plurality of radially oriented RF-excited eddy current coils located in a plane uniformly about the periphery of an aperture in the housing for receiving the control rods axially therein. At least one circumferentially oriented RF-excited eddy current coil is located circumferentially about the aperture axially adjacent to the radial coils. The coils produce corresponding magnetic fields in a zone adjacent the opening. The rod is moved axially in a controlled manner through the aperture, and changes in the magnetic fields resulting from changes in the surface of the rod cladding produce analog signals in the coils which are coupled via an analog-to-digital (A/D) converter to a central processing unit (CPU) which analyzes the outputs and produces a profile of the volume and surface characteristics of the rod. In accordance with selected criteria, volume and radial changes indicate localized wear to a depth corresponding to changes in the output of the radially oriented transducers. Radial change alone results in an unambiguous conclusion of no wear.

According to another embodiment of the invention, a test fixture having an array of eddy current transducer means is provided for measuring a plurality of test pieces simultaneously. In the method, a selected group of test pieces is measured at one time and the test pieces are rotated relative to the array to measure another selected group of test pieces.

BRIEF DESCRIPTION OF THE DRAWINGS

FIG. 3A is a plan view with parts broken away of an eddy current detector for use in the present invention, with a control rod shown in horizontal section inserted therein.

FIG. 3B is a sectional view of the eddy current detector, taken along line 3b-3b of FIG. 3A.

FIG. 3C is a sectional view of a fuel rod exhibiting cladding flattening.

FIG. 3D is a sectional view of a fuel rod similar to FIG. 3A exhibiting cladding wear.

DETAILED DESCRIPTION OF THE PREFERRED EMBODIMENTS

Figure 1:
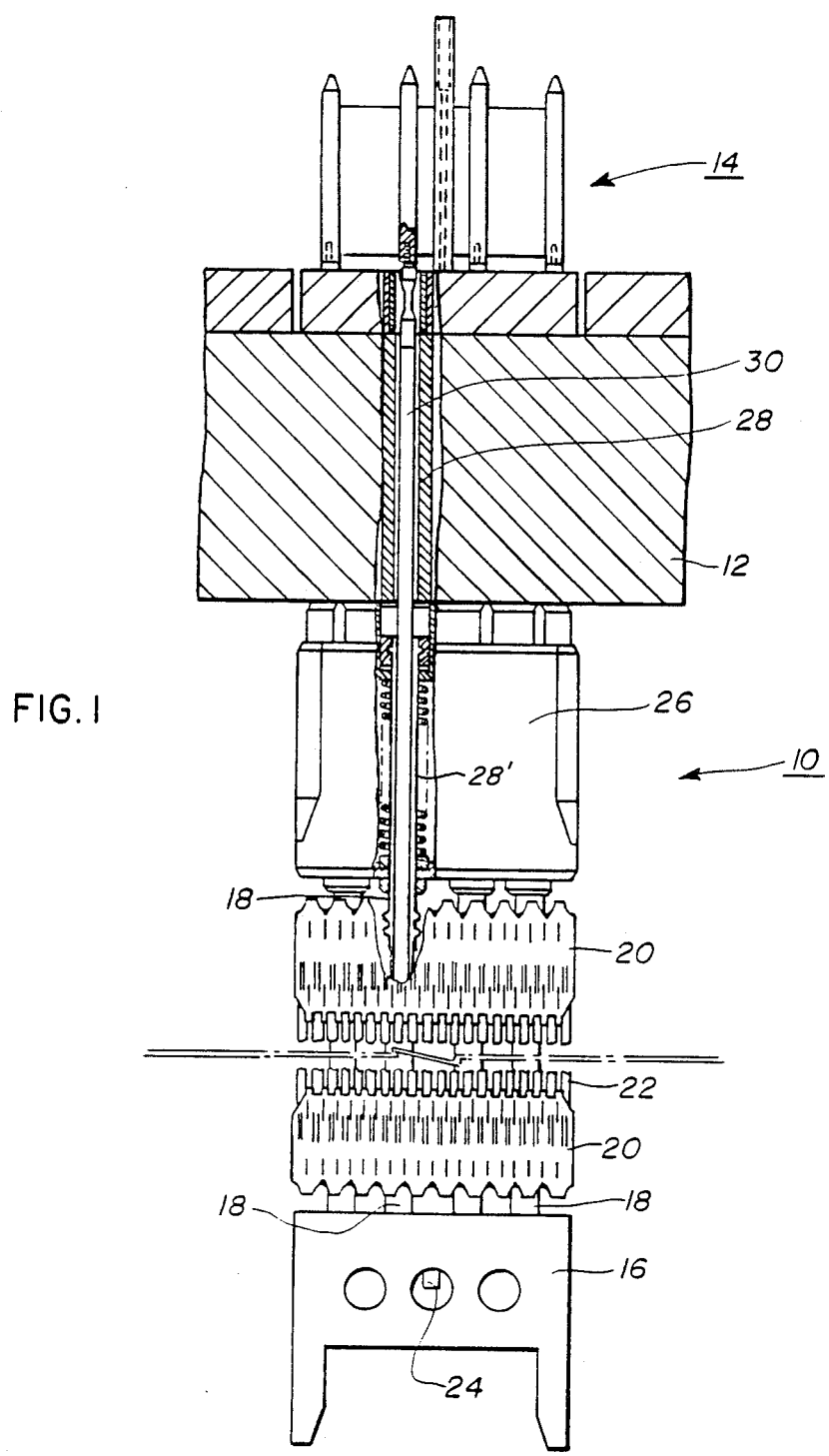
FIG. 1 is an elevational view of an exemplary fuel assembly with control rods supported so as to extend down into the guide thimbles of the assembly, the latter being illustrated in vertically foreshortened form with parts broken away for clarity.

In the following description, like reference characters designate like or corresponding parts through the several views of the drawings. Also in the following description, it is to be understood that such terms as "forward", "rearward", "left", "right", "Upwardly", "downwardly", and the like, are words of convenience and are not to be construed as limiting terms.

In General

Referring now to the drawings, and particularly to FIG. 1, there is shown an overall combination of an exemplary conventional fuel assembly, generally designated by the numeral 10, an upper core support plate 12 disposed above and extending across the top of fuel assembly 10, and a spider assembly 14 disposed above the upper core support plate 12.

The fuel assembly 10, shown in a vertically foreshortened form in FIG. 1, includes a bottom nozzle 16 for supporting the assembly on a lower core plate (not shown) in the core region of a reactor (not shown) and a number of longitudinally extending guide tubes or thimbles 18 which project upwardly from the bottom nozzle 16. The assembly 10 further includes a plurality of transverse grids 20 axially spaced along the guide thimbles 18 and an organized array of elongated fuel rods 22 transversely spaced and supported by the grids 20. The assembly 10 has an instrumentation tube 24 located in the center thereof. A top nozzle 26 is attached to the upper ends of the guide thimbles 18. With such known arrangement of parts, the fuel assembly 10 forms an integral unit capable of being conventionally handled.

The upper core support plate 12 extends across the top of the fuel assembly 10 as well as across the top of other identical fuel assemblies (not shown) arranged within the core. The core support plate 12 and top nozzle 26 each have a multiplicity of respective flow openings 28-28' (only one of each of which is seen in FIG. 1) to allow coolant to pass upwardly through the core. At least some of the openings 28-28' are aligned over the guide thimbles 18. Control rods 30 pass through the core plate 12 and are insertable into the guide thimbles 18 of the fuel assembly 10.

The spider assembly 14 is connected to the upper ends of the control rods 30 and supports the rods for vertical movement within the guide thimbles 18 by a conventional drive mechanism (not shown). In the illustrated embodiment, the spider assembly 14 is disposed above the core plate 12 and is supported thereon when the control rods 30 are fully inserted in the guide thimbles 18 as seen in FIG. 1. In their withdrawn positions, the control rods 30 extend a short distance into the upper ends of the guide thimbles 18 and through the superadjacent top nozzle 26 and core support plate 12.

Figure 2A:
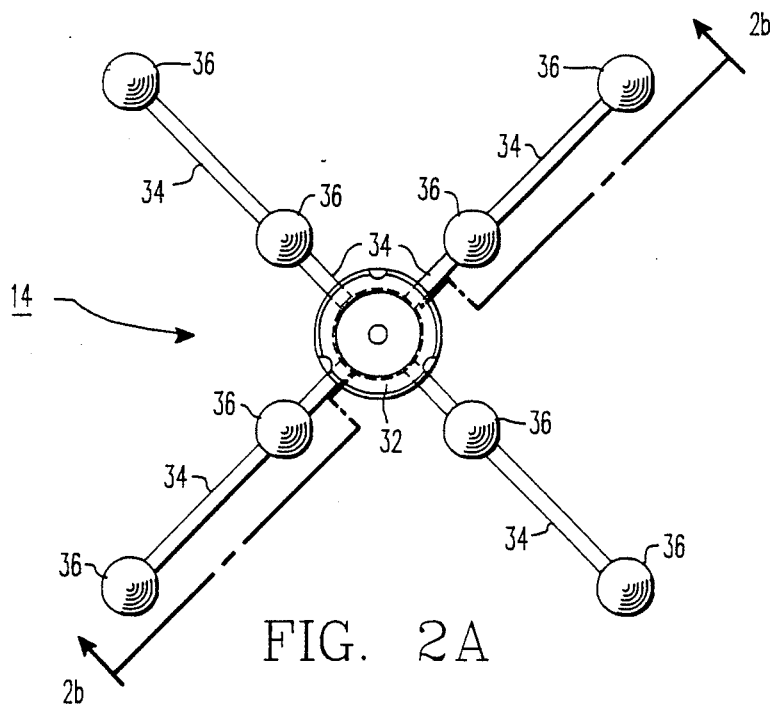
FIG. 2A is an enlarged top plan view of an exemplary spider assembly which includes the control rods.
Figure 2B:
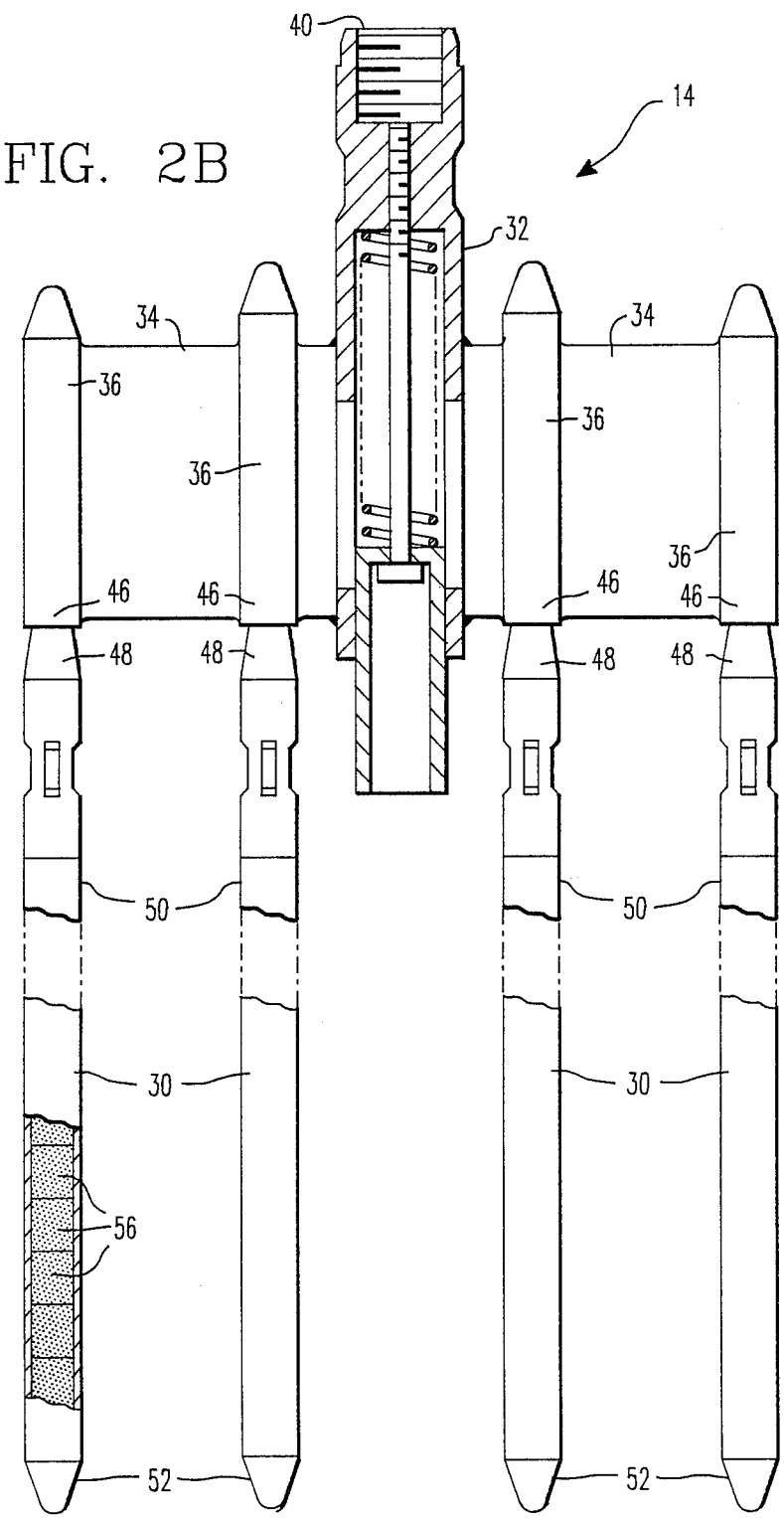
FIG. 2B is a side sectional view of the spider assembly shown in FIG. 2A taken along line 2b-2b of FIG. 2A.

As seen in FIGS. 2A and 2B, the exemplary spider assembly 14 includes a central hub 32, a plurality of vanes 34 radially extending outwardly from the hub 32, and a plurality of fingers 36 secured to the vanes 34 for connection with the upper ends of the control rods 30. The central hub 32 is preferably in the form of an elongated cylindrical tube having on its upper end an internally threaded segment 40 (FIG. 2B) for connection with the drive mechanism (not shown) which vertically raises and lowers the spider assembly 14 and the control rods 30 therewith in a conventional manner.

As seen in FIG. 2B, each control rod 30 is supported by one of the elongated fingers 36 of the spider assembly 14. The lower end 46 of each finger 36 is drilled and internally threaded for connection with the upper end 48 of the control rod 30. Each control rod 30 includes an outer elongated hollow tubular member or cladding 50 containing neutron absorbing pellets 56 and an end plug 52 attached to the lower end 54 of the cladding 50. In some control rod designs, the pellets 56 are of a material which does not absorb neutron (water displacer rods) and the control of the reactor is achieved by the displacement of the water moderator.

Eddy Current Testing

In accordance with the present invention means is provided to accurately and unambiguously determine rod wear. Figures 3A and 3B show in schematic form respectively a partially broken away top view and a side sectional view of an individual exemplary eddy current probe or transducer 60 of the present invention having a control rod 30 (test piece) located therein. The transducer 60 is formed in part of a body of material 62 having an axial hole 64 therein for receiving the control rod 30. The hole 64 has a diameter $D_t$. The cladding 50 of the control rod has respective outer and inner diameters $D_O$ and $D_i$. In practice, the outer diameter $D_O$ of the control rod is relatively close to diameter $D_t$ of the axial hole 64 in the transducer 60, and the control rod 30 is moved axially in the direction of the double-headed arrows a as shown in FIG. 3B.

The transducer 60 is formed with a plurality of radial openings 66, each receiving therein one radially aligned eddy current coil 60R. Preferably, the radial openings 66 are located in the same plane, at right angles to the axis A of the hole 64 and evenly circumferentially spaced thereabout. A circumferential groove 68 in communication with the hole 64 is preferably located in a plane parallel with the radial transducers 60R and at right angles to the axis A of the hole 64. A circumferential eddy current coil 60C is located in the groove 68. As shown in FIG. 3A, each of the radial coils 60R has a corresponding input/output (IO) line labeled R1 through R8, in the clockwise sense. The circumferential coil 60C has an IO labeled C.

Each radial coil 60R and the circumferential coil 60C is excited by an oscillator (for example a radio frequency or RF oscillator not shown in FIGS. 3A and 3B, but shown and referred to hereinafter). The RF excitation produces a corresponding stationary or non-rotating radial magnetic field MR in the radial coils 60R between opposite poles 60P and a circumferential magnetic field MC about circumferential coil 60C (FIG. 3B). The amount of material and configuration of material forming the sheath or cladding 50 of the control rod 30 acts as an inductive load which has an effect on the various magnetic fields. A change in the geometry of the control rod 30 has a corresponding effect on inductance, thereby effecting field strength which results in a corresponding change in the current flowing in each of the IOs R1-R8 and C. Thus, each RF excited radial coil 60R acts as a radial measuring probe and the RF excited circumferential coil 60C acts as a circumferential measuring probe. Changes in the currents in the coils 60R and 60C are sensed and interpreted by means hereinafter described.

Radial changes in the control rod 30 are sensed by radial coils 60R. Volume changes therein are sensed by circumferential coil $R_C$. In the present invention, a standard control rod (not shown) may be used to calibrate the transducer 60 so that a departure from outputs produced as a result of passing the standard through the hole 64 forms the basis for determining changes in the geometry of the control rod 30 under test. One or more changed in rod dimensions beyond selected limits results in a rod rejection or failure indication.

In accordance with the present invention, a change in the volume of the material forming the cladding 50 forms a basis for inferring that the control rod 30 is worn. Further, a change in the diameter of the control rod 30 forms a basis for determining whether the control rod has experienced wear. However, in accordance with the present invention, control rod wear is unambiguously determined only if there is both a change in volume of the cladding 50 and a change in the radius of the control rod 30. For example, a volume change, as determined by the circumferential transducer 60C, indicates at least that the control rod cladding 50 has been distorted in its shape. Such distortion, if within tolerable limits, may be ignored.

In order to determine whether the volume change is tolerable, it is necessary to measure the thickness t (FIG. 3B) of the cladding 50 at the position of the volume measurement. This is accomplished by means of the circumferentially spaced radial coils 60R each of which produce an output signal corresponding to the radius ($D_O/2$) of the rod 30. The thickness t of the cladding may be inferred from radial displacement or spacing s of the rod 30 with respect to each of the respective radial coils 60R.

The circumferentially-spaced radial coils 60R can only measure the cross-sectional profile of the rod 30. These coils 60R cannot distinguish between mechanical deformation, i.e. flattening or dent 52 (shown exaggerated in FIG. 3C), of the cladding 50 and cladding wear 54 (shown exaggerated in FIG. 3D). To make this distinction between deformation 52 and wear 54, the outputs from the radial coils 60R and circumferential coil 60C are combined.

With respect to the deformed cladding of FIG. 3C, while the radial coils 60R would indicate an abnormal condition due to the dent 52 in the cladding 50, the circumferential coil 60C would indicate no volume change since the thickness t is unchanged. The combination of these two outputs would indicate that the cladding 50 in FIG. 3C only has a relatively minor dent 52 and that control rod 30 integrity has not been compromised.

In the case of the cladding wear 54 represented by FIG. 3D however, the thickness t' at the wear point 54 is reduced thereby indicating a volume change. Thus, the volume output of circumferential coil 60C would deviate from the norm. The wear-area 54 would again show a radial deviation by the output of the radial coils 60R. When matched with the volume output of the circumferential coil 60C, the area of wear 54 can be identified.

To obtain these measurements, a control rod 30 would be inserted in the transducer 60. As the rod 30 is withdrawn in a controlled manner, the readings would be processed by a computer. Since the circumferential coil 60C and radial coils 60R are separated by a known distance h (FIG. 3B), the outputs from various levels of the rod 30 can be readily correlated to determine the condition of the cladding 50. The axial location for the cross-sectional data is obtained by multiplying the speed at which the rod 30 is withdrawn by the elapsed time. The result would then be added to a zero reference point defined by the end of the rod 30 for example. The cross-sectional, or X and Y vector, data of the coils 60C and 60R are then correlated with this axial location, or Z vector, data to obtain a three dimensional representation of the rod 30, based on Cartesian coordinates.

If the thickness and volume of the cladding 50 change for any specific axial position of the control rod 30 then the wear in the rod is proportional to the change in radius of the rod 30 at that point. If the wear is sufficiently outside tolerable limits, the control rod should be taken out of service.

Other defects may include a crack or perforation in the wall or cladding 50 which manifests itself by other outputs from the transducers which may be compared with standard signals for such defects.

Test Fixture

Figure 4:
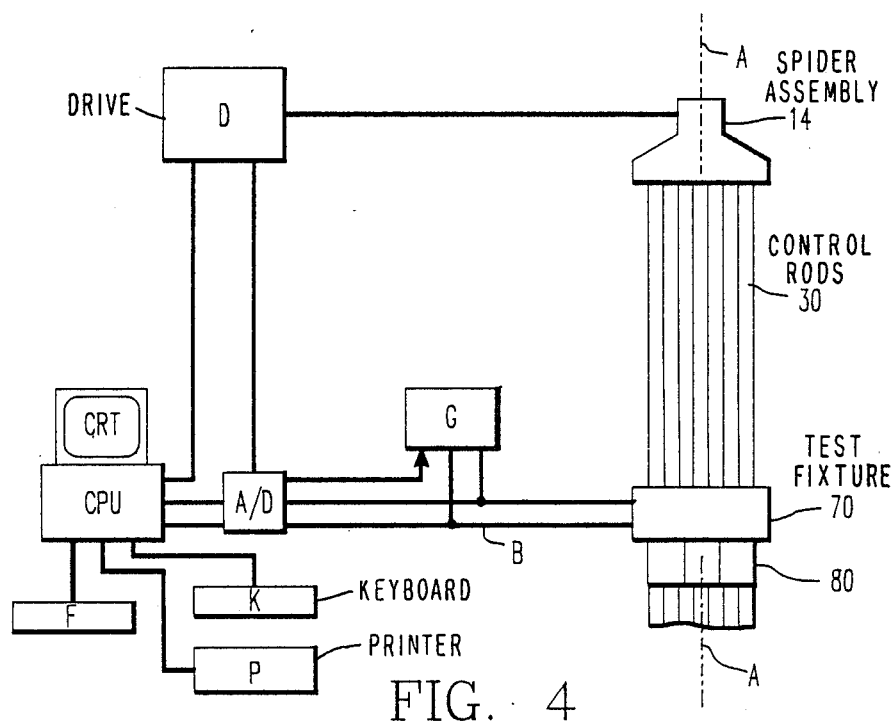
FIG. 4 is a schematic representation of an apparatus for carrying out the present invention including a test fixture employing the eddy current dectector illustrated in FIGS. 3A and 3B, located atop a spent fuel storage rack, with the spider assembly of FIG. 2B shown partially inserted therein and an electrical diagram in block form showing test equipment coupled to the test fixture.

FIG. 4 shows schematically an arrangement for determining variations in the dimensions of a number of control rods 30 in accordance with the present invention. In FIG. 4, the spider assembly 14 and the rods 30 supported thereby may be removed from the core of the reactor (not shown) and located in a spent fuel rack 80 during a refueling operation. In accordance with the present invention, in the course of refueling the reactor, a transducer test fixture 70 (also shown in FIG. 5) may be located above the spent fuel rack 80. The control rods 30 supported by the spider 14 may be lowered through the transducer test fixture 70 in order to perform a multiplicity of tests on the various control rods 30. Outputs from the transducer test fixture 70 are coupled by means of a cable or bus B to the input of an analog-to-digital converter A/D. The cable B is also coupled to an RF generator G. The generator G produces signals which excite the radial and circumferential coils 60R and 60C shown in FIGS. 3A, 3B and 5. Any change in the magnetic field produced by the excited coils 60R and 60C is detected by the converter A/D as changes in current. A central processing unit CPU stores data in memory including measurement and position data and data corresponding to standard rods and standard defects. The CPU is responsively coupled to the converter A/D. The CPU controls RF generator G via the A/D converter, and the CPU analyzes A/D outputs resulting from the RF excitation of the coils 60R and 60C, which may be interpreted as indications of the wear in the cladding 50 of the control rods 30. A printer P coupled to the CPU produces a hard copy of the CPU results. A floppy or hard disk F or the like, a cathode ray tube CRT or like display and a keyboard K are coupled to the CPU for allowing convenient user interfacing in a known manner. A drive D operates the spider 14 in a known manner. The drive D is coupled to the CPU via the A/D converter for providing axial location data for the various measurements to the CPU. Drive D may also be controlled by the CPU if desired.

Figure 5:
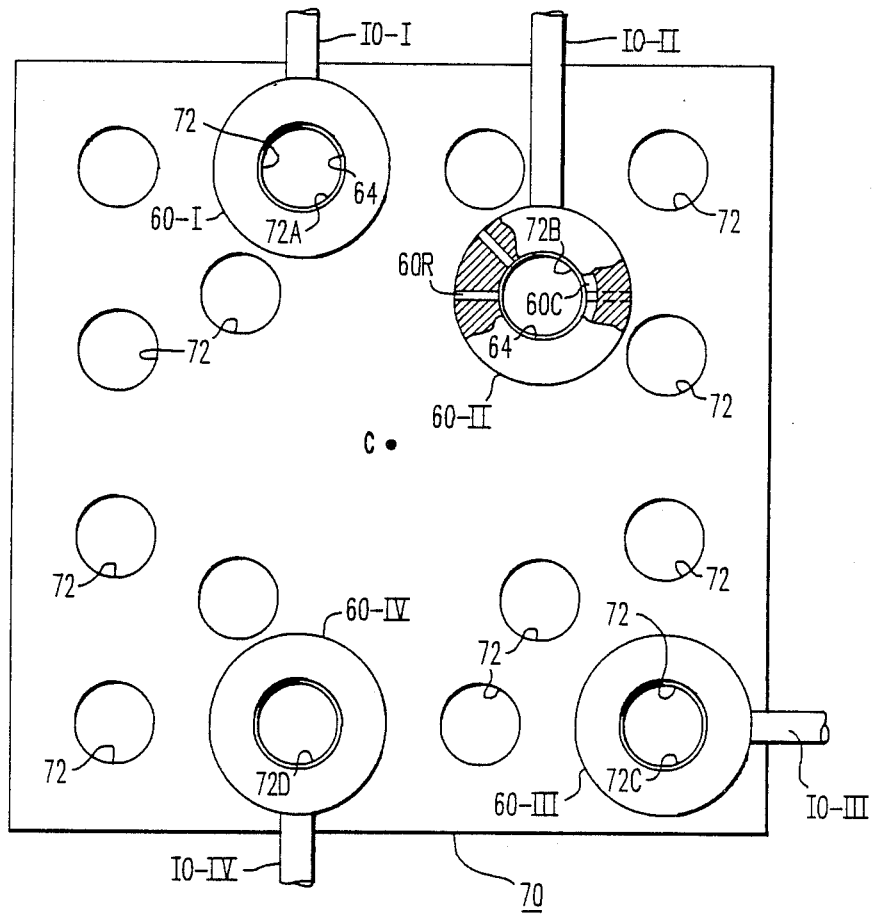
FIG. 5 shows an example with parts broken away of the test fixture of FIG. 4 for a 16-rod bundle.

In FIG. 5, the transducer test fixture 70 is shown for an exemplary sixteen (16) rod bundle, arranged symmetrically about hub 32 of spider 14 (FIG. 2A). The transducer test fixture 70 includes an array of holes 72 symmetrically, arranged about center C, which holes 72 correspond to the positioning of the control rods 30.

The transducer test fixture 70 is positioned above the spent fuel rack 80 so that its center C is concentric with the axis A of the spider assembly 14 (FIG. 4). A plurality of transducer units 60I-60IV having openings 64 are located coaxially with selected holes 72A-72D as shown. Transducer units 60I-60V correspond to the transducer unit 60 shown in FIGS. 3A and 3B. Each transducer unit 60I-60IV has a corresponding input-/output (IO-I-IO-IV).

In accordance with the present invention, the spider assembly 14 (FIG. 4) is located above the transducer test fixture 70 with the control rods 30 axially aligned with each of the holes 72 (FIG. 5). The control rods 30 supported by the spider assembly 14 are lowered into and through the holes 72 of the test fixture 70 and into the spent fuel rack 80 and placed at rest. Thereafter, the spider assembly 14 is raised by drive D (FIG. 4) at a specified constant lifting rate. The RF oscillator G excites the transducer units 60I-60IV and the respective outputs IO-I-IO-IV are coupled to the CPU via the converter A/D as hereinbefore described to provide data concerning the particular rods in the transducers 60I-60IV.

In accordance with the arrangement of FIG. 5, four control rods may be analyzed simultaneously. Thereafter the spider assembly 14 is raised so that the rods clear the transducer test fixture 70. The spider 14 is then rotated 90 degrees about its axis A to reposition the rods 30 above the transducer text fixture 70 so that four different rods are aligned with the transducers 60I-6-0IV. The spider 14 is lowered whereby the rods are reinserted into the transducer test fixture 70, and lowered into the spent fuel rack 80 as hereinbefore described. The process of withdrawal and measuring is repeated for the four new rods. Rotation of the spider assembly 14 occurs after each set of measurements until the spider assembly is rotated through 360 degrees. As can be seen from the arrangement of FIG. 5, all sixteen control rods will be tested if the procedure is conducted four times in 90 degree increments. Other arrangements are possible for greater or lesser numbers of control rods, and the arrangement of FIG. 5 is exemplary of a sixteen control rod array.

The overall logic of the arrangement of the present invention requires that a change in volume, and a change in radius of the control rod 30 must both occur before a wear defect is recognized. The degree of the change in volume or diameter is a function of previously determined calibrations which may be conducted with a standard set of control rods. Such control rods may be fabricated with controlled defects for calibration and comparison purposes.

In the invention, the outputs of the radial coils 60R and circumferential coil 60C are subject to variation if the rod 30 moves laterally relative to the transducer 60. One or more pairs of resiliently mounted rollers 80 may be used to laterally support or stabilize and confine the rod 30 relative to the transducer. Analysis of data from the transducer should include correction for any remaining lateral movement in the rod 30 relative to the transducer 60.

In accordance with the present invention, very accurate and unambiguous results may be achieved by analysis of the outputs of radial and circumferentially oriented eddy current test coils. Radial coils 60R give an accurate determination of control rod radius, and the circumferential coil 60C gives an accurate measurement of the volume of the control rod cladding 50. Analysis of this data for specific axial positions by means of the CPU provides accurate and unambiguous results as to the condition of the control rods. This data may be used to remove from service damaged or worn control rods. Further, a maintenance schedule compatible with refueling cycles may also be established as a result of the data produced in accordance with the subject invention.

While the invention has been described in connection with specific embodiments thereof, it will be understood that it is capable of further modifications. The claims are intended to cover any variations, uses or adaptations of the invention following, in general, the principles of the invention, and including such departures from the present disclosure as come within known and customary practice within the art to which the invention pertains.

We claim as our invention:

1. Apparatus for measuring and locating wear in a test piece subject to distortion, comprising:
    a transducer test fixture having at least one through-hole therein for passage of said test piece, said hole having a shape corresponding closely to the shape of the test piece;
    an RF-excited circumferential coil mounted in the test fixture and adapted to surround said hole in a plane perpendicular to a longitudinal axis of the hole for producing a circumferential magnetic field, said circumferential coil producing a corresponding RF volume output in response to volume changes in the test piece;
    a plurality of RF-excited radial coils, for producing a radial magnetic field, mounted in the test fixture and circumferentially spaced about said hole such that the axes about which the coils turn are normal to the surface of said hole, said radial coils producing corresponding RF thickness outputs in response to thickness changes in the test piece; and
    means for distinguishing wear in the piece from distortion responsive to said volume and thickness outputs for generating an output corresponding to localized wear when the values of said volume and thickness outputs are outside preselected limits.

2. The apparatus as set forth in claim 1, further comprising:
    drive means for drawing the test piece through said hole at a specified constant lifting rate and for using this lifting rate to produce an output corresponding to the axial location on the test piece of various said volume and radial measurements.

3. The apparatus as set forth in claim 2, wherein said means responsive to said volume and radial displacement outputs is also responsive to said axial location output for generating an output corresponding to a three-dimensional representation of the test piece, wherein said three-dimensional representation provides the axial location on the test piece of any localized wear detected.

4. The apparatus is set forth in claim 3, wherein said means responsive to said volume and thickness outputs and said axial location output for generating an output corresponding to a three-dimensional representation of the test piece and to localized wear comprises:
    analog-to-digital converter means responsive to said outputs of the circumferential and radial coils for producing digital outputs corresponding to said outputs; and processor means, including means for storing calibration data relative to said test piece, for producing data corresponding to said three-dimensional representation of the test piece and for producing said output corresponding to localized wear.

5. The apparatus as set forth in claim 1, wherein the RF-excited coils are eddy current coils.

6. The apparatus as set forth in claim 1, wherein the apparatus measures and locates wear in control rods of a nuclear reactor, said control rods provided with means for supporting the control rods symmetrically for axial and circumferential movement about an axis corresponding to the axis of a spent fuel rack;
wherein said transducer test fixture is located above said fuel rack and has openings therein for receiving the control rods longitudinally as the control rods are lowered into and withdrawn from said spent fuel rack, selected ones of said openings being equipped with said circumferential and radial coils.

7. The apparatus of claim 1 wherein the radial field is stationary.

8. The apparatus as set forth in claim 1, further including means for exciting the coils, including an RF oscillator for impressing an RF input on said coils.

9. The apparatus as set forth in claim 1, wherein the test piece comprises at least one nuclear control rod.

10. The apparatus as set forth in claim 1 adapted for measuring and locating wear in a plurality of said test pieces, wherein said transducer test fixture has a plurality of holes therein, selected ones thereof being equipped with the circumferential and radial coils, each hole for receiving therein one of said test pieces at a time.

11. The apparatus as set forth in claim 10, wherein the test pieces are arranged in a preselected symmetrical array and the holes in said transducer test fixture are arranged in a similar array for receiving the test pieces therein and at least one fourth of the holes are equipped with radial and circumferential coils, so that no more than four measurements are required to examine each of the end test pieces in the array.

12. The apparatus as set forth in claim 1, further including means for laterally stabilizing the position of the test piece in said hole.

13. An apparatus for measuring and locating wear in control rods of a nuclear reactor, wherein the control rods are supported for axial and circumferential movement about an axis corresponding to the axis of a spent fuel rack, comprising:
drive means for lowering and withdrawing said control rods into and from said spent fuel rack;
a test fixture located above said spent fuel rack having openings therein for receiving the control rods longitudinally as the control rods are lowered into and withdrawn from said spent fuel rack, selected ones of said openings having probe means, mounted to portions of the test fixture adjacent said selected openings, for determining the volume and thickness of the control rod walls at selected axial locations longitudinally of said rods as the rods move in said openings;
means responsive to the drive means for producing an output indicative of the longitudinal position of the control rods in the openings;
analog-to-digital converter means responsive to the output of the probe means and the means responsive to the drive means for producing a digital representative thereof;
processor means responsive to the output of the analog-to-digital converter means; and
stored program means including data corresponding to a calibration standard for said control rods for producing an output indicative of defect when the volume and thickness of said control rod wall varies by a selected amount at each of said selected axial locations.

14. A method for measuring and locating wear in a test piece subject to distortion of its shape, comprising the steps of:
encircling said test piece with a circumferential coil;
placing a plurality of radial coils about the circumference of said test piece;
impressing an RF input on said coils such that the circumferential coil produces a circumferential magnetic field and the radial coils produce a radial magnetic field;
determining the volume of said test piece within at least one zone along the length of said test piece by measuring the extent of current change in said circumferential coil in response to a change in volume of said test piece;
determining the thickness of said test piece within said at least one zone by measuring the extent of current change in said radial coils in response to a radial displacement of said test piece;
distinguishing wear from distortion of the test piece by comparing said volume and said thickness with known values and generating an output corresponding to localized wear when the determined values of said volume and said thickness are outside preselected limits of the known values.

15. The method of claim 14 wherein the radial coils produce a stationary field.

16. The method as set forth in claim 14, further including the steps of:
axially determining the location of the volume and thickness determinations.

17. The method of claim 16, further including the steps of laterally stabilizing the position of the test piece as the volume, radial displacement, and axial determinations are made.

18. The method as set forth in claim 14, wherein the test piece is arranged in a symmetrical array of nuclear reactor control rods supported for rotation about an axis symmetrical with said array, wherein the method further comprises the steps of:
measuring at least N/4 of the control rods by moving the control rods axially of a test fixture; and
rotating the array of control rods about the axis in 90 degree increments and repeating the test procedure three times.

19. Apparatus for measuring and locating wear in a test piece subject to wear and distortion, comprising:
a transducer test fixture having at least one throughhole therein for passage of said test piece, said hole having a shape corresponding closely to the shape of the test piece;
an RF-excited circumferential coil mounted in the test fixture and adapted to surround said hole in a plane perpendicular to a longitudinal axis of the hole for producing a circumferential magnetic field, said circumferential coil producing a corresponding RF volume output in response to volume changes in the test piece;
a plurality of RF-excited radial coils, for producing a radial magnetic field, mounted in the test fixture and circumferentially spaced about said hole such that the axes about which the coils turn are normal to the surface of said hole, said radial coils producing corresponding RF thickness outputs in response to thickness changes in the test piece; and means for distinguishing wear of the test piece from distortion thereof responsive to said volume and thickness outputs for generating output corresponding to localized wear when the values of said volume and radial output are outside preselected limits.

20. Apparatus for measuring and locating wear in a test piece, comprising:

a transducer test fixture having at least one through-hole therein for passage of said test piece, said hole having a shape corresponding closely to the shape of the test piece;

an RF-excited circumferential coil mounted in the test fixture and adapted to surround said hole in a plane perpendicular to a longitudinal axis of the hole for producing a circumferential magnetic field, said circumferential coil producing a corresponding RF volume output in response to volume changes corresponding to wear and volume changes corresponding to distortion in the shape of the test piece;

a plurality of RF-excited radial coils, for producing a stationary radial magnetic field, mounted in the test fixture and circumferentially spaced about said hole such that the axes about which the coils turn are normal to the surface of said hole, said radial coils producing corresponding RF thickness outputs in response to radial displacements corresponding to wear and radial displacements corresponding to distortions of the shape of the test piece; and means for distinguishing tolerable distortion in the shape of the test piece from intolerable wear in said test piece responsive to said volume output and radial outputs for generating wear output corresponding to localized wear when the values of said volume output and at least one radial output are outside preselected limits.

* * * * *